US012706685B2

(12) United States Patent
Bollapragada et al.

(10) Patent No.: US 12,706,685 B2

(45) Date of Patent: Aug. 11, 2026

(54) PTP 1-STEP BOUNDARY CLOCK WITHOUT HARDWARE SYNCHRONIZATION

(71) Applicant: Arista Networks, Inc., Santa Clara, CA (US)

(72) Inventors: Sourabh Bollapragada, Burnaby (CA); Jeff Jing Yuen Chan, Burnaby (CA); Avininderpal Singh Grewal, Langley (CA); Jim George Nangany, Ottawa (CA); Scott William Hill Bailey, New Westminster (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 354 days.

(21) Appl. No.: 18/506,829

(22) Filed: Nov. 10, 2023

(65) Prior Publication Data

US 2025/0158729 A1 May 15, 2025

(51) Int. Cl.
*H04J 3/06* (2006.01)

(52) U.S. Cl.
CPC .......... *H04J 3/0685* (2013.01); *H04J 3/0667* (2013.01); *H04J 3/0673* (2013.01)

(58) Field of Classification Search
USPC .......................................................... 370/503
See application file for complete search history.

(56) References Cited

U.S. PATENT DOCUMENTS 5,153,849 A * 10/1992 Venzl .................... G06F 7/5318 708/626
8,976,750 B1 * 3/2015 Pearson ............ H04W 56/0065 370/509
2013/0034191 A1 * 2/2013 Sakai .................. H04B 17/318 375/316
2017/0366287 A1 * 12/2017 Zeng ..................... H04J 3/0667
2020/0021378 A1 * 1/2020 Aweya .................. H04J 3/0673
2021/0297230 A1 * 9/2021 Dror ..................... H04L 7/0016
2024/0291580 A1 * 8/2024 Ambeskar ............. H04J 3/0641
2025/0132851 A1 * 4/2025 Lu ......................... H04J 3/0667

* cited by examiner

*Primary Examiner* — Gregory B Sefcheck
*Assistant Examiner* — Majid Esmaeilian
(74) *Attorney, Agent, or Firm* — Fountainhead Law Group, PC

(57) ABSTRACT

A Sync message to start off a 1-step synchronization sequence includes a timestamp ($T_1'$) that represents a time when the Sync message entered the packet processing pipeline of a network device to be processed for egress to a slave device. The packet processing pipeline stores a timestamp ($T_{duration}$) in the Sync message as part of processing the Sync message. The timestamp $T_{duration}$ represents the amount of time spent in the packet processing pipeline. The slave device that receive Sync message computes $T_1$ by summing the timestamps $T_1'$ and $T_{duration}$ stored in the received Sync. message, where $T_1$ represents the time when the Sync message left the network device.

17 Claims, 5 Drawing Sheets

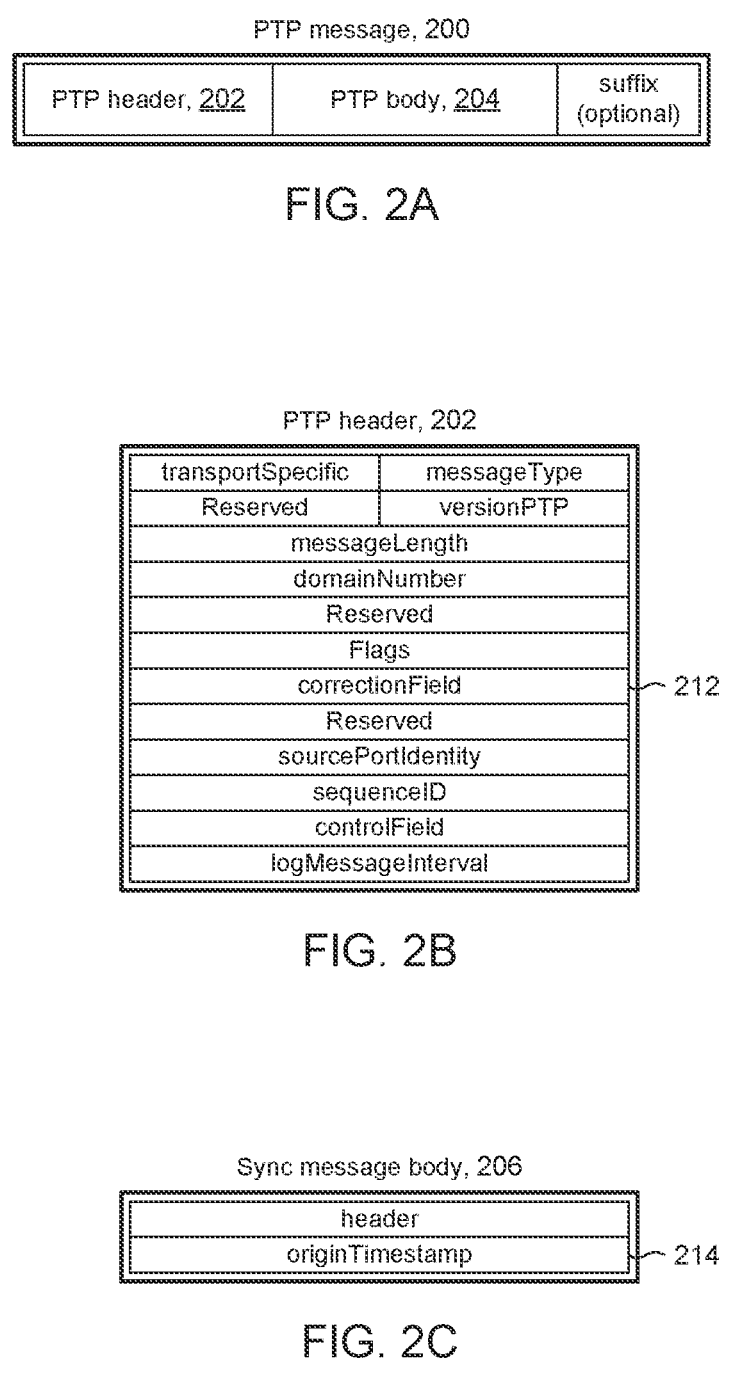

PTP message, 200

| PTP header, 202 | PTP body, 204 | suffix (optional) |
|---|---|---|

FIG. 2A

PTP header, 202

| transportSpecific | messageType |
|---|---|
| Reserved | versionPTP |
| messageLength | |
| domainNumber | |
| Reserved | |
| Flags | |
| correctionField | |
| Reserved | |
| sourcePortIdentity | |
| sequenceID | |
| controlField | |
| logMessageInterval | |

Sync message body, 206

| header |
|---|
| originTimestamp |

PTP 1-STEP BOUNDARY CLOCK WITHOUT HARDWARE SYNCHRONIZATION

BACKGROUND

The present disclosure is generally directed to Precision Time Protocol (PTP), and in particular to the 1-step synchronization mechanism, per the Institute of Electrical and Electronics Engineers (IEEE) 1588-2008 specification which is incorporated herein by reference in its entirety. In the 1-step mechanism, the master device sends $T_1$ (the time when the Sync message leaves the master device) in the Sync message itself, as compared to the 2-step mechanism where $T_1$ is sent in a follow up message. The Sync message includes an originTimestamp data field and a correctionField data field. The originTimestamp data field stores a time value ($T_1$) that represents when the Sync message leaves the master device. The correctionField data field can be used to account for various delays in reaching the slave device. The slave device computes:

$$T_1 = originTimestamp + correctionField$$

which represents the time that the slave device receives the Sync message.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 2A, 2B, and 2C represent message formats for a Sync message.

DETAILED DESCRIPTION

Figure 1:
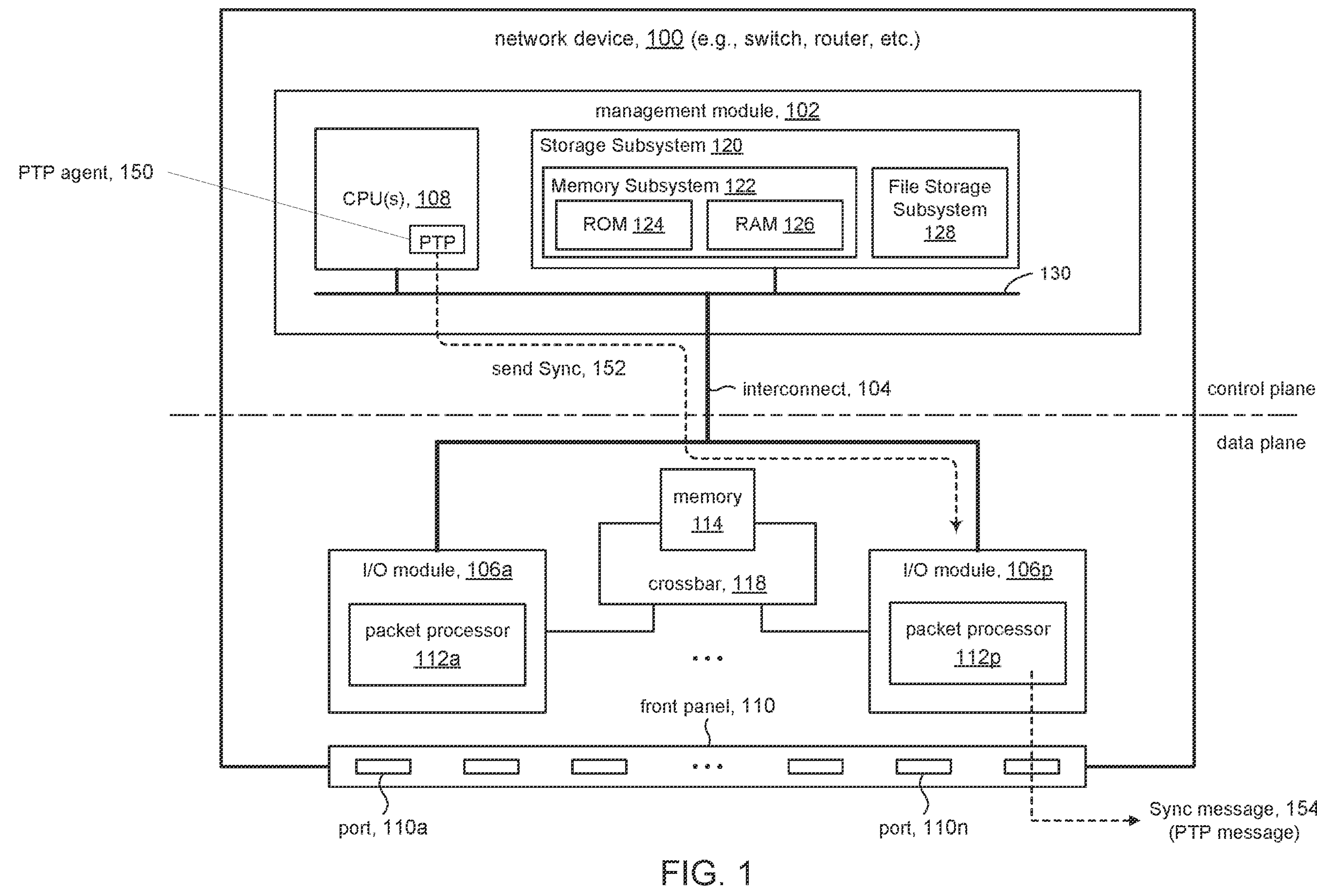
FIG. 1 is a high level block diagram of a network device in accordance with the present disclosure.

In some implementations, the packet processing pipeline in the master device that processes PTP Sync messages for egress is unable or otherwise not configured to operate on the originTimestamp data field in the Sync message but is configured to operate on the correctionField data field in the message. As such, the packet processing pipeline is not capable of storing into the originTimestamp data field a timestamp that represents a current time when the packet processing pipeline transmits the Sync message; i.e., when the Sync message leaves the master device.

A network device (master device) in accordance with the present disclosure can perform the following operations to generate and send a Sync message to a slave device (another network device) that accommodates for a packet processing pipeline that is not configured to fill in the originTimestamp data field:

- A PTP agent running on the master device can initiate a 1-step synchronization sequence with another network device (slave device) by sending a Sync message to a kernel process running on the master device.
- The kernel process receives the Sync message and stores a HW timestamp ($T_1'$) in the originTimestamp data field. The HW timestamp is a representation of time and can be based on a HW counter. The kernel process sends the Sync message to the packet processing pipeline.
- The timestamp $T_1'$ represents the time at which the message entered the pipeline. So, in the context of processing in the pipeline, $T_1'$ can be referred to as $T_{start}$; i.e., $T_1' \leftrightarrow T_{start}$.
- Performs an arithmetic addition to add the negative of $T_{start}$ ($-T_{start}$) to the correctionField data field of the Sync message. So the correctionField data field contains the value $-T_{start}$. In some embodiments, the kernel can perform this operation prior to sending the Sync message into the packet processing pipeline. In other embodiments, this operation can be performed in the packet processing pipeline.
- The packet processing pipeline:
  - The Sync message progresses down the pipeline for further processing.
  - At the egress end of the packet processing pipeline, the current timestamp ($T_{end}$) is read from the HW counter and arithmetically added to the value in the correctionField data field in the Sync message to compute:

$$T_{end} - T_{start},$$

which represents the amount of time spent in the pipeline.
  - Transmits the Sync message.
- The slave device receives the Sync message and computes:

$$originTimestamp + correctionField,$$

which represents the time when the Sync message left the master device, taking into account the time spent in the pipeline.

In some embodiments, the HW counter is not synchronized to a master clock to which the master device is synchronized. This difference can be accounted for by multiplying $T_1'$ with a skew factor:

$$T_1' \times skew$$

and storing the product in the originTimestamp data field of the Sync message. The skew is the ratio of change in the master clock with change in the HW counter.

The data size of the HW clock can be larger than the data size of the originTimestamp data field. For example, the time value $T_1'$ from the HW clock can be a 64-bit number, whereas the correctionField data field is only 48 bits. In some embodiments, the least significant 48 bits of $T_1'$ can be stored in the correctionField data field.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

FIG. 1 is a schematic representation of a network device 100 (e.g., a router, switch, firewall, and the like) that can be adapted in accordance with the present disclosure. In some embodiments, for example, network device 100 can include a management module 102, one or more I/O modules (e.g., switches, switch chips) 106*a*-106*p*, and a front panel 110 of I/O ports (e.g., physical interfaces, I/Fs) 110*a*-110*n*. Management module 102 can constitute the control plane of network device 100 (also referred to as the control layer or simply the central processing unit, CPU), and can include one or more CPUs 108 for managing and controlling operation of network device 100 in accordance with the present disclosure. Each CPU 108 can be a general-purpose processor, such as an Intel®/AMD® x86, ARM® microprocessor and the like, that operates under the control of software stored in a memory device/chips such as read-only memory (ROM) 124 or random-access memory (RAM) 126. The control plane provides services that include traffic management functions such as routing, security, load balancing, analysis, and the like.

CPUs 108 can communicate with storage subsystem 120 via bus subsystem 130. Other subsystems, such as a network interface subsystem (not shown in FIG. 1), may be on bus subsystem 130. Storage subsystem 120 can include memory subsystem 122 and file/disk storage subsystem 128. Memory subsystem 122 and file/disk storage subsystem 128 represent examples of non-transitory computer-readable storage devices that can store program code and/or data, which when executed by one or more CPUs 108, can cause the CPUs to perform operations in accordance with embodiments of the present disclosure.

Memory subsystem 122 can include a number of memories such as main RAM 126 (e.g., static RAM, dynamic RAM, etc.) for storage of instructions and data during program execution, and ROM (read-only memory) 124 on which fixed instructions and data can be stored. File storage subsystem 128 can provide persistent (i.e., non-volatile) storage for program and data files, and can include storage technologies such as solid-state drive and/or other types of storage media known in the art.

CPUs 108 can run a network operating system stored in storage subsystem 120. A network operating system is a specialized operating system for network device 100. For example, the network operating system can be the Arista EOS® operating system, which is a fully programmable and highly modular, Linux-based network operating system developed and sold/licensed by Arista Networks, Inc. of Santa Clara, California. It is understood that other network operating systems may be used.

Bus subsystem 130 can provide a mechanism for the various components and subsystems of management module 102 to communicate with each other as intended. Although bus subsystem 130 is shown schematically as a single bus, alternative embodiments of the bus subsystem can utilize multiple buses.

I/O modules 106*a*-106*p* can be collectively referred to as the data plane of network device 100 (also referred to as the data layer, forwarding plane, etc.). Interconnect 104 represents interconnections between modules in the control plane and modules in the data plane. Interconnect 104 can be any suitable bus architecture such as Peripheral Component Interconnect Express (PCIe), System Management Bus (SMBus), Inter-Integrated Circuit (I2C), etc.

I/O modules 106*a*-106*p* can include respective packet processing hardware comprising packet processors 112*a*-112*p* (collectively 112) to provide packet processing and forwarding capability. Each I/O module 106*a*-106*p* can be further configured to communicate over one or more ports 110*a*-110*n* on the front panel 110 to receive and forward network traffic. Packet processors 112 can comprise hardware (circuitry), including for example, data processing hardware such as an application specific integrated circuit (ASIC), field programmable array (FPGA), processing unit, and the like, which can be configured to operate in accordance with the present disclosure. Packet processors 112 can include forwarding lookup hardware such as, for example, but not limited to content addressable memory such as ternary CAMs (TCAMs) and auxiliary memory such as static RAM (SRAM).

Memory hardware 114 can include buffers used for queueing packets. I/O modules 106*a*-106*p* can access memory hardware 114 via crossbar 118. It is noted that in other embodiments, memory hardware 114 can be incorporated into each I/O module or some combination thereof. The forwarding hardware in conjunction with the lookup hardware can provide wire speed decisions on how to process ingress packets and outgoing packets for egress. In accordance with some embodiments, some aspects of the present disclosure can be performed wholly within the data plane.

In accordance with some embodiments, one or more processes (e.g., PTP agent 150) running on CPU 108 can initiate PTP synchronization. FIG. 1 illustrates an example, where CPU 108 communicates a Sync command 152 (e.g., a Sync message) to an I/O module 106*p*. In response, packet processor 112*p* in the I/O module can produce an egress Sync message 154 (PTP message) in accordance with the present disclosure.

FIG. 2A shows a format of a PTP message 200, in accordance with IEEE 1588-2008. PTP message 200 can comprise a PTP header portion 202, a PTP body portion 204, and an optional suffix portion. PTP header 202 is common to all PTP messages. PTP body 204 differs depending on the type of message (Sync, Follow Up, etc.). An example of a PTP body is the Sync message body shown in FIG. 2C. FIG. 2B shows a format for PTP header 202 of a PTP message in accordance with some embodiments. correctionField data field 212 is pertinent to the present disclosure. FIG. 2C shows a format of a Sync message body 206 in accordance with some embodiments. originTimestamp data field 214 is pertinent to the present disclosure.

In the context of PTP, it will be appreciated that the term "device" (as in master network device or slave network device) can be used interchangeably with the term "clock." The latter is more general in that "clock" covers virtualized environments, where the (slave or master) device is not a physical machine but rather is a virtualized instantiation of a physical machine, a virtual machine. Accordingly, the term "clock" covers physical devices and virtualized devices, and may be used interchangeably in the present disclosure.

Figure 3:
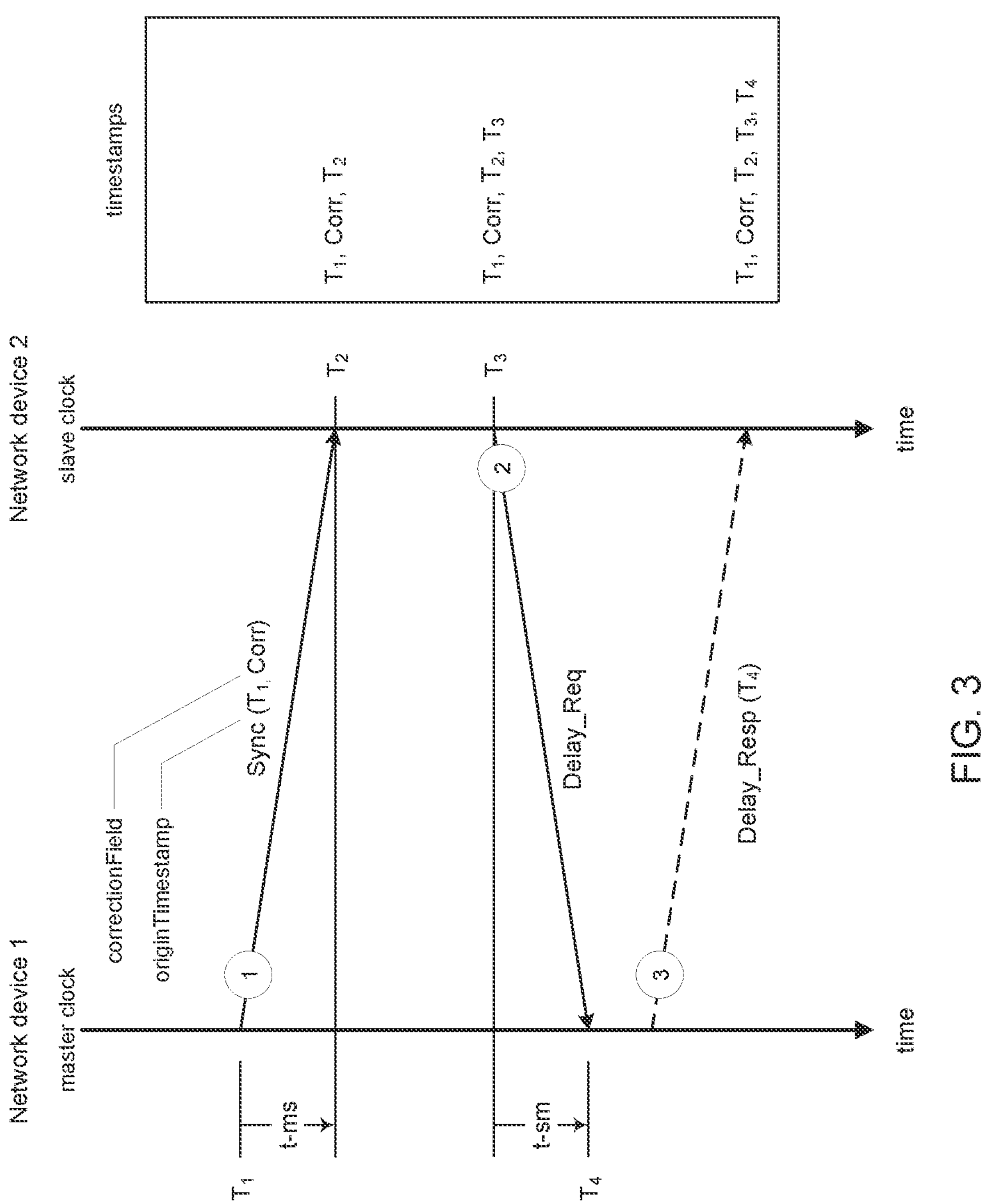
FIG. 3 shows a PTP 1-step synchronization sequence.

Referring now to FIG. 3, a synchronization sequence in accordance with IEEE 1588-2008 is shown, and in particular the 1-step synchronization sequence. The sequence will be described with respect to the sequence index numbers shown in the figure by the circled numbers. At index 1, the master clock sends a Sync message to the slave clock. The timestamp $T_1$ represents the time that the Sync message leaves the master clock. The master clock stores timestamp $T_1$ in the originTimestamp data field of the Sync message. The master clock may also store a correction value ($T_{corr}$) in the correctionField data field. At index 2, the slave clock receives the Sync message and records the timestamp information contained in the Sync message, namely $T_1$, and a timestamp $T_2$ that represents the time of receipt of the Sync message by the slave clock. The slave clock then sends a Delay_Req message to the master clock and records a timestamp $T_3$ representing when the Delay_Req message was sent. The master clock receives the Delay_Req message and notes the time of reception $T_4$. At index 3, the master clock conveys to the slave clock the timestamp $T_4$ by embedding $T_4$ in a Delay_Resp message and sending the Delay_Resp message to the slave clock. The slave clock receives the Delay_Resp message and records the timestamp $T_4$.

At the conclusion of this exchange of messages, the slave clock has recorded the timestamps, $T_1$, $T_{corr}$, $T_2$, $T_3$, and $T_4$. These timestamps can be used to compute the offset between the slave clock and the master clock per IEEE 1588-2008, for example:

$$\text{offset} = ((T_2 - T_1) - (T_4 - T_3))/2$$

The slave clock utilizes offset to adjust its time to agree with the master clock.

As noted above, the timestamp $T_{corr}$ is a correction value that is used to adjust $T_1$:

$$T_1 \leftarrow T_1 + T_{corr}$$

before computing offset to account for any delays in sending the Sync message to the slave clock.

Figure 4:
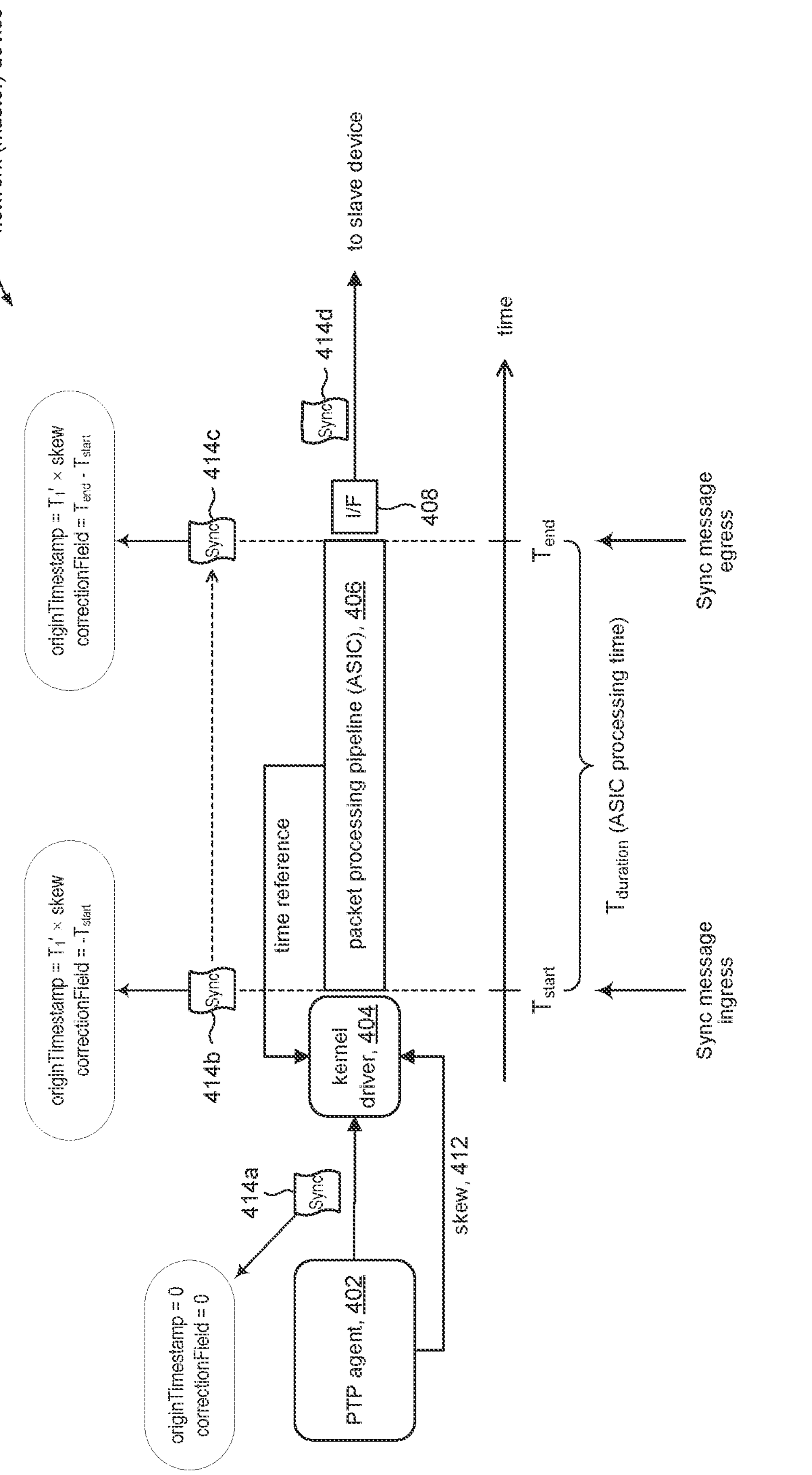
FIG. 4 is a high-level block diagram of components in a network device for generating a Sync message in accordance with some embodiments of the present disclosure.

FIG. 4 illustrates elements in a network (master) device in accordance with some embodiments to generate Sync messages in accordance with the present disclosure. A brief overview of these elements is provided here, with additional details described in connection with FIG. 5. Briefly, a PTP agent 402 running in the control plane can generate a Sync message 414*a* to initiate a PTP synchronization sequence (e.g., FIG. 3). The generated Sync message 414*a* can be passed on to kernel driver 404. Kernel driver 404 can serve as an interface between PTP agent 402 and the hardware in the data plane, namely packet processing pipeline 406. In some embodiments, PTP agent 402 can provide a skew factor 412 to the kernel driver. Kernel driver 404 can update the Sync message and pass the updated Sync message 414*b* to packet processing pipeline 406. The packet processing pipeline can process the updated Sync message to produce a processed sync message 414*c*, which can then be transmitted via an interface 408 of the network device as egress packet 414*d* to a slave device. Operations performed by the elements in FIG. 4 will now be described in connection with FIG. 5.

Figure 5:
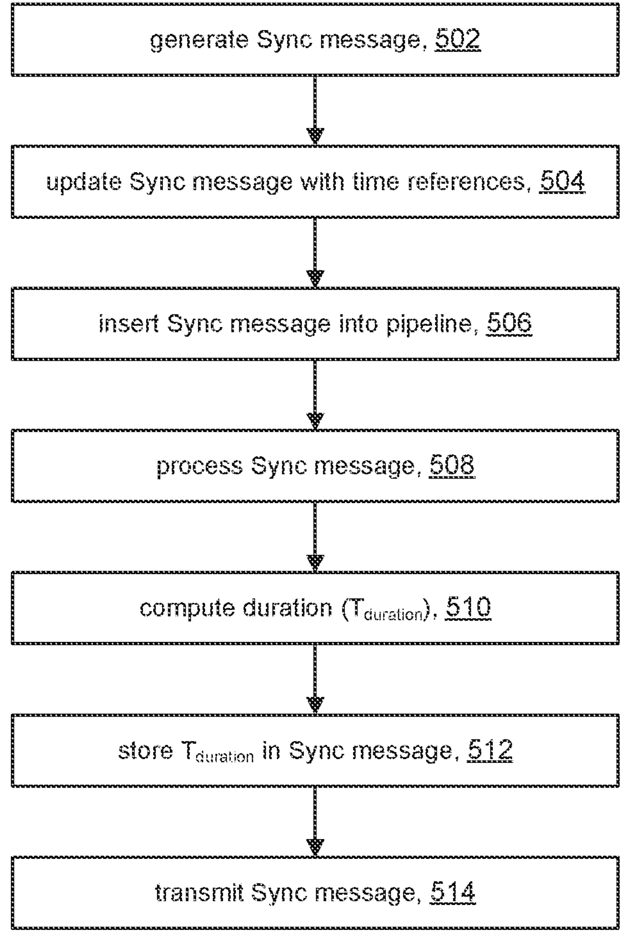
FIG. 5 is a process flow in accordance with some embodiments.

Referring to FIGS. 4 and 5, the discussion will now turn to a high-level description of processing in a network device (acting as a master device) for generating PTP Sync messages in accordance with the present disclosure. Depending on a given implementation, the processing may be performed entirely in the control plane or entirely in the data plane, or the processing may be divided between the control plane and the data plane. In some embodiments, the network device can include one or more processing units (circuits), which when operated, can cause the network device to perform processing in accordance with FIG. 5. Processing units (circuits) in the control plane, for example, can include general CPUs that operate by way of executing computer program code stored on a non-volatile computer readable storage medium (e.g., read-only memory); e.g., CPU 108 in the control plane (FIG. 1) can be a general CPU. Processing units (circuits) in the data plane can include specialized processors such as digital signal processors, field programmable gate arrays, application specific integrated circuits, and the like, that operate by way of executing computer program code or by way of logic circuits being configured for specific operations.

The operation and processing blocks described below are not necessarily executed in the order shown. Operations can be combined or broken out into smaller operations in various embodiments. Operations can be allocated for execution among one or more concurrently executing processes and/or threads.

At operation 502, the master device can generate or otherwise instantiate a Sync message to begin a PTP synchronization sequence (e.g., FIG. 3). Referring to FIG. 4, for example, PTP agent 402 can generate PTP 1-step Sync messages at a regular user-configured interval. The generated Sync messages 414*a* do not have any timestamps in them; for example, the originTimestamp and correctionField data fields can be initialized to '0'.

At operation 504, the master device can update the generated Sync message with timestamps (time references). Referring to FIG. 4, for example, the kernel driver 404 can update Sync message 414*a* received from PTP agent 402 with timestamps to produce an updated Sync message 414*b* for insertion into packet processing pipeline 406. The kernel driver can obtain a timestamp that represents the current time. In some embodiments, for example, the ASIC that constitutes packet processing pipeline 406 can include a hardware counter (not shown), where the counts can serve to represent time. The kernel driver can obtain or otherwise retrieve the current count value from the ASIC's hardware counter as a representation of the current time; i.e., the timestamp. For discussion purposes, the obtained timestamp can be referred to as $T_1'$ or $T_{start}$. In some embodiments, the originTimestamp data field stores a 64-bit timestamp (in other words, $T_1'$ is a 64-bit value), whereas the correctionField data field stores a 48-bit value. Accordingly, in some embodiments, the 48 least significant bits of the 64-bit timestamp $T_1'$ can be used to get $T_{start}$.

In accordance with the present disclosure, the kernel driver can store $T_1'$ in the originTimestamp data field (214, FIG. 2C) of the Sync message, just before sending the Sync message to the packet processing pipeline. In some embodiments, the value that is stored in the originTimestamp data field of Sync message 414*b* can be scaled by a skew factor 412. This aspect of the present disclosure is discussed in more detail below.

Further in accordance with the present disclosure, the kernel driver can store the negative of $T_1'$ (as $-T_{start}$) in the correctionField data field (212, FIG. 2B) of the Sync message. In some embodiments, the kernel driver can arithmetically subtract the value $T_1'$ from the value stored in the correctionField data field and store the result in the correctionField data field. In other embodiments, the kernel driver can generate and store the 2's complement of $T_1'$ in the correctionField data field; or stated another way, the kernel driver can arithmetically add $-T_1'$ to the correctionField data field.

At operation 506, the master device can insert the Sync message into the packet processing pipeline to begin processing the Sync message for egress. Referring to FIG. 4, for example, in some embodiments, the kernel driver can insert Sync message 414*b*, updated with the timestamps in accordance with the present disclosure, into packet processing pipeline 406. As can be seen in FIG. 4, $T_1'$ ($T_{start}$) represents the time when the Sync message was inserted into the packet processing pipeline.

At operation 508, the master device can process the Sync message for egress. Operations can include updating Ethernet headers, IP headers, encapsulating the Sync message, VLAN tagging, and the like.

At operation 510, the master device can compute a duration. Referring to FIG. 4, for example, at the end of processing in the packet processing pipeline, just before the processed Sync message 414*c* leaves the master device, the packet processing pipeline can determine the amount of time the Sync message spent in the packet processing pipeline. In some embodiments, for example, the packet processing pipeline can obtain or otherwise retrieve the current count value from its hardware counter (not shown), which represents the current time (call it $T_{end}$). The packet processing pipeline can arithmetically add $T_{end}$ to the value stored in the correctionField data field of Sync message 414*c*. Recall that upon entering the packet processing pipeline, the correctionField data field contained $-T_{start}$. The arithmetic addition effectively computes:

$$T_{duration} = T_{end} - T_{start},$$

where $T_{duration}$ represents the processing time of the Sync message in the packet processing pipeline. In other words, $T_{duration}$ represents the time spent in the packet processing pipeline.

At operation 512, the master device can store $T_{duration}$ in the processed Sync message. Referring to FIG. 4, for example, the packet processing pipeline can store $T_{duration}$ in the correctionField data field of the processed Sync message 414*c*, replacing the previously stored value $-T_{start}$. At this point, the originTimestamp data field in Sync message 414*c* contains a timestamp that represents when the Sync message entered the packet processing pipeline, and the correctionField data field contains a timestamp that represents the amount of time the Sync message spent in the packet processing pipeline.

At operation 514, the master device can transmit the processed Sync message. Referring to FIG. 4, for example, the packet processing pipeline can encapsulate the processed Sync message 414*c* in an egress packet 414*d* and transmit the egress packet to the slave device, thus initiating a PTP 1-step synchronization sequence. As noted above, the Sync message contains $T_1'$ stored in the originTimestamp data field, which represents the time that the Sync message entered the packet processing pipeline. The correctionField data field contains the $T_{duration}$, which represents the time spent in the packet processing pipeline processing the Sync message, up to the point when the Sync message is transmitted. When the slave device receives the Sync message from the master device, the slave device computes:

$$\begin{aligned} T_1 &= originTimestamp + correctionField \\ &= T_1' + T_{duration} \end{aligned}$$

in accordance with IEEE 1588-2008. The computed $T_1$ represents the time when the Sync message left the master device. The computed value for $T_1$ can then be used by the slave device to calculate its offset value, for example as described above in connection with FIG. 3.

The present disclosure can accommodate a packet processing pipeline that is capable of operating on the correctionField data field of a Sync message but not on the originTimestamp data field. For example, the packet processing pipeline may be capable of arithmetically adding a timestamp to the correctionField data field or storing a timestamp to the correctionField data field but cannot access the originTimestamp data field. As such, the packet processing pipeline cannot store $T_1$, the timestamp that represents when the packet processing pipeline transmits the Sync message to the slave device, into the originTimestamp data field.

Processing in accordance with the present disclosure stores a time ($T_1'$) into the originTimestamp data field just before the Sync message enters the packet processing pipeline; e.g., via the kernel driver. The packet processing pipeline computes and stores the processing time of, or time spent in, the packet processing pipeline ($T_{duration}$) in the correctionField data field. When the slave device operating in accordance with IEEE 1588-2008 adds the originTimestamp and correctionField data fields, the slave device obtains the desired $T_1$.

Skew Factor

Figure 6:
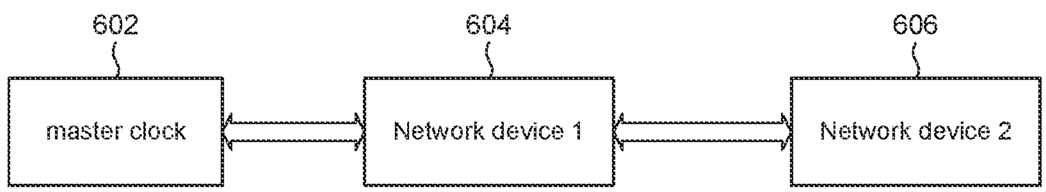
FIG. 6 illustrates a configuration that computes and uses a skew factor.

Referring to FIG. 6, a network device 604 that initiates the PTP 1-step synchronization sequence with another network device 606, may itself be a slave that is synchronized to another master clock 602. However, the hardware counter in the packet processing pipeline of network device 604 will not necessarily be synchronized to master clock 602 because the hardware counter runs on its own independently of the master clock 602. As such, there is a difference in the counting rate between the hardware counter in network device 604 and the clock in master clock 602. Skew factor 412 shown in FIG. 4 serves as a correction factor to compensate for the different rates between master clock 602 and network device 604 when network device 604 synchronizes with network device 606. In some embodiments, the timestamp that is stored in the originTimestamp data field of Sync message 414*b* can be adjusted (scaled) by the skew factor so that the slave device is also synchronized to the master clock.

In some embodiments, the skew factor can be computed as a ratio of change in the master clock with change in the hardware counter in the network device. FIG. 6 illustrates how network device 604 can compute the skew factor for use in Sync messages sent to network device 606. In some embodiments, for example:

- Master clock 602 initiates a synchronization sequence with network device 604 by sending a Sync message to network device 604. The hardware counter in network device 604 produces an ingress timestamp ($T_2$) when the received Sync message enters the ASIC of network device 604 for processing.
- The ASIC in network device 604 processes the receive Sync message which includes reading the originTimestamp and correctionField data fields to compute $T_1$, $$T1 = originTimestamp + correctionField$$

- When network device 604 receives the next Sync message from master clock 602, network device 604 will compute $T_2'$ and $T_1'$.

Network device 604 can now compute skew factor 412 as a ratio of the differences in timestamps, namely:

$$\text{skew} = (T2' - T2)/(T1' - T1).$$

Network device 604 now knows how fast its hardware counter is counting compared to master clock 602. When network device 604 sends Sync messages to network device 606, the timestamps in the Sync messages can be multiplied by the skew factor to account for hardware counter differences in counting rate.

The skew factor can be recomputed on a repeated basis using subsequent/y received Sync messages sent from master clock 602.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method performed in a network device for transmitting a Precision Time Protocol (PTP) Sync message, the method comprising:

instantiating a Sync message;

reading out a first time reference ($T_1$') from a counter;

storing $T_1$' in an originTimestamp data field of the Sync message;

providing the Sync message to packet processing hardware, wherein the packet processing hardware:

stores a value equal to a negative of $T_1$' ($-T_1$') in a correctionField data field of the Sync message prior to processing the Sync message;

processes the Sync message;

reads out a second time reference ($T_{end}$) from the counter prior to completing processing of the Sync message;

arithmetically adds $T_{end}$ to the correctionField data field of the Sync message; and transmits the Sync message to a slave device, wherein storing $T_1$' in the origin Timestamp data field includes computing a product by multiplying $T_1$' by a skew factor and storing the product of the multiplication in the originTimestamp data field, wherein the skew factor represents a timing difference between the counter and a master clock separate from the network device.

2. The method of claim 1, wherein $T_1$' represents a time when the Sync message is provided to the packet processing hardware, wherein the correctionField data field stores a value that represents an amount of time that the Sync message spent in the packet processing hardware.

3. The method of claim 1, wherein the packet processing hardware stores the value $-T_1$' in the correctionField data field by storing a 2's complement of $T_1$' in the correctionField data field.

4. The method of claim 1, wherein the packet processing hardware stores $-T_1$' in the correctionField data field by arithmetically adding $-T_1$' to the correctionField data field.

5. The method of claim 1, wherein the network device synchronizes with the master clock.

6. The method of claim 1, wherein $T_1$' is N bits and the correctionField data field is M bits (M<N), wherein the lowest M bits of $-T_1$' is stored in the correctionField data field.

7. The method of claim 1, wherein the slave device receives the Sync message and computes a value $T_1$ by adding $T_1$' stored in the originTimestamp data field of the received Sync message and a value stored in the correctionField data field of the received Sync message, wherein $T_1$ represents a time when the Sync message leaves the network device.

8. A method performed in a network device for transmitting a Precision Time Protocol (PTP) Sync message, the method comprising the network device:

generating the Sync message for processing in a packet processing pipeline;

storing a time value ($T_1$') in an originTimestamp data field of the Sync message that represents when the Sync message entered the packet processing pipeline;

computing a time value ($T_{duration}$) that represents an amount of time the Sync message spent in the packet processing pipeline;

storing the time value $T_{duration}$ in a correctionField data field of the Sync message; and transmitting the Sync message to a slave device, wherein storing $T_1$' in the originTimestamp data field includes computing a product by multiplying $T_1$' by a skew factor and storing the product of the multiplication in the originTimestamp data field, wherein the skew factor represents a timing difference between the counter and a master clock separate from the network device.

9. The method of claim 8, wherein computing the time value $T_{duration}$ includes:

storing a value equal to $-T_1$' in the correctionField data field of the Sync message prior to providing the Sync message to the packet processing pipeline;

providing the Sync message to the packet processing pipeline; and prior to transmitting the Sync message:

obtaining a time value ($T_{end}$) that represents when processing the Sync message in the packet processing pipeline has completed; and arithmetically adding the time value $T_{end}$ to the correctionField data field of the Sync message.

10. The method of claim 9, wherein the value $-T_1$' is a 2's complement of the time value $T_1$'.

11. The method of claim 9, wherein storing a value equal to $-T_1$' in the correctionField data field includes arithmetically subtracting the time value $T_1$' from the value stored in the correctionField data field and storing the difference in the correctionField data field.

12. The method of claim 8, wherein $T_1$' is N bits and the correctionField data field is M bits (M<N), wherein the lowest M bits of $-T_1$' is stored in the correctionField data field.

13. The method of claim 8, wherein the slave device receives the Sync message and computes a value $T_1$ by adding $T_1$' stored in the origin Timestamp data field of the received Sync message and the time value $T_{duration}$ stored in the correctionField data field of the received Sync message, wherein $T_1$ represents a time when the Sync message exited the network device.

14. A network device comprising:

one or more computer processors; and a computer-readable storage device comprising instructions for controlling the one or more computer processors to:

generate a Precision Time Protocol (PTP) Sync message for processing in a packet processing pipeline;

store a time value ($T_1'$) in an originTimestamp data field of the Sync message that represents when the Sync message entered the packet processing pipeline;

compute a time value ($T_{duration}$) that represents an amount of time the Sync message spent in the packet processing pipeline;

store the time value $T_{duration}$ in a correctionField data field of the Sync message; and transmit the Sync message to a slave device, wherein storing $T_1'$ in the originTimestamp data field includes computing a product by multiplying $T_1'$ by a skew factor and storing the product of the multiplication in the originTimestamp data field, wherein the skew factor represents a timing difference between the counter and a master clock separate from the network device.

15. The network device of claim 14, where computing the time value $T_{duration}$ includes:

storing a value equal to $-T_1'$ in the correctionField data field of the Sync message prior to providing the Sync message to the packet processing pipeline;

providing the Sync message to the packet processing pipeline; and prior to transmitting the Sync message:

obtaining a time value ($T_{end}$) that represents when processing the Sync message in the packet processing pipeline has completed; and arithmetically adding the time value $T_{end}$ to the correctionField data field of the Sync message.

16. The network device of claim 14, wherein the value $-T_1'$ is a 2's complement of the time value $T_1'$.

17. The network device of claim 14, wherein storing a value equal to $-T_1'$ in the correctionField data field includes arithmetically subtracting the time value $T_1'$ from the value stored in the correctionField data field and storing the difference in the correctionField data field.

* * * * *